US012572414B2

(12) United States Patent (10) Patent No.: US 12,572,414 B2
Zhang et al. (45) Date of Patent: Mar. 10, 2026

(54) HYBRID ERROR CORRECTION SYSTEM DESIGN FOR MULTIMODE SOLID-STATE DRIVES

(71) Applicant: ScaleFlux, Inc., San Jose, CA (US)

(72) Inventors: Tong Zhang, Albany, NY (US); Mark Vernon, Park City, UT (US); Ganesh Venkatakrishnan, Milpitas, CA (US); Yang Liu, Milpitas, CA (US); Fei Sun, Irvine, CA (US)

(73) Assignee: SCALEFLUX, INC., San Jose, CA (US)

( * ) Notice: Subject to any disclaimer, the term of this patent is extended or adjusted under 35 U.S.C. 154(b) by 72 days.

(21) Appl. No.: 18/581,946

(22) Filed: Feb. 20, 2024

(65) Prior Publication Data

US 2025/0265147 A1 Aug. 21, 2025

(51) Int. Cl.
*G06F 11/10* (2006.01)
*G06F 3/06* (2006.01)

(52) U.S. Cl.
CPC ........ *G06F 11/1044* (2013.01); *G06F 3/0644* (2013.01); *G06F 11/1068* (2013.01); *G06F 11/1072* (2013.01)

(58) Field of Classification Search
CPC ............. G06F 11/1044; G06F 11/1068; G06F 11/1072; G06F 3/064; G06F 3/0644
See application file for complete search history.

(56) References Cited

U.S. PATENT DOCUMENTS

| | | | | |
|---|---|---|---|---|
| 11,258,464 B1 * | 2/2022 | Steiner | | H03M 13/152 |
| 11,387,848 B1 * | 7/2022 | Berman | | H03M 13/2906 |
| 2007/0057825 A1 * | 3/2007 | De Martin | | H04N 19/44 |
| | | | | 375/E7.231 |
| 2013/0024748 A1 * | 1/2013 | Sharon | | G06F 11/1072 |
| | | | | 711/E12.001 |
| 2013/0311854 A1 * | 11/2013 | Tsunehiro | | G06F 11/1068 |
| | | | | 714/E11.054 |
| 2017/0220441 A1 * | 8/2017 | Zhang | | G06F 11/1092 |
| 2019/0079859 A1 * | 3/2019 | Li | | G06F 12/0246 |

OTHER PUBLICATIONS

Generalization of an Enhanced ECC Methodology for Low Power PSRAM by Po-Yuan Chen Published in: IEEE Transactions on Computers (Jul. 2013) https://ieeexplore.ieee.org/stamp/stamp.jsp?tp=&arnumber=6189334 (Year: 2013).*

* cited by examiner

*Primary Examiner* — Joseph O Schell

(74) *Attorney, Agent, or Firm* — Hoffman Warnick LLC

(57) ABSTRACT

A multimode solid-state drive (SSD) and associated method. An SSD includes: a plurality of flash memory chips addressable via a physical block address (PBA); and a controller chip configured to map logical block addresses (LBAs) from a host to PBAs, wherein the controller chip is further configured to handle different LBA block sizes according to a process that includes: partitioning a base partition to store one a long code word of size $C_{long}$ having a single base data block protected with error correction coding (ECC); and partitioning a set of non-base partitions, each partitioned for a plurality of shortened code words, wherein each shortened code word is configured to store a shortened data block protected with ECC, and wherein the plurality of shortened code words are configured to be protected with ECC as a combined long codeword of size $C_{long}$.

20 Claims, 7 Drawing Sheets

Figure 3:
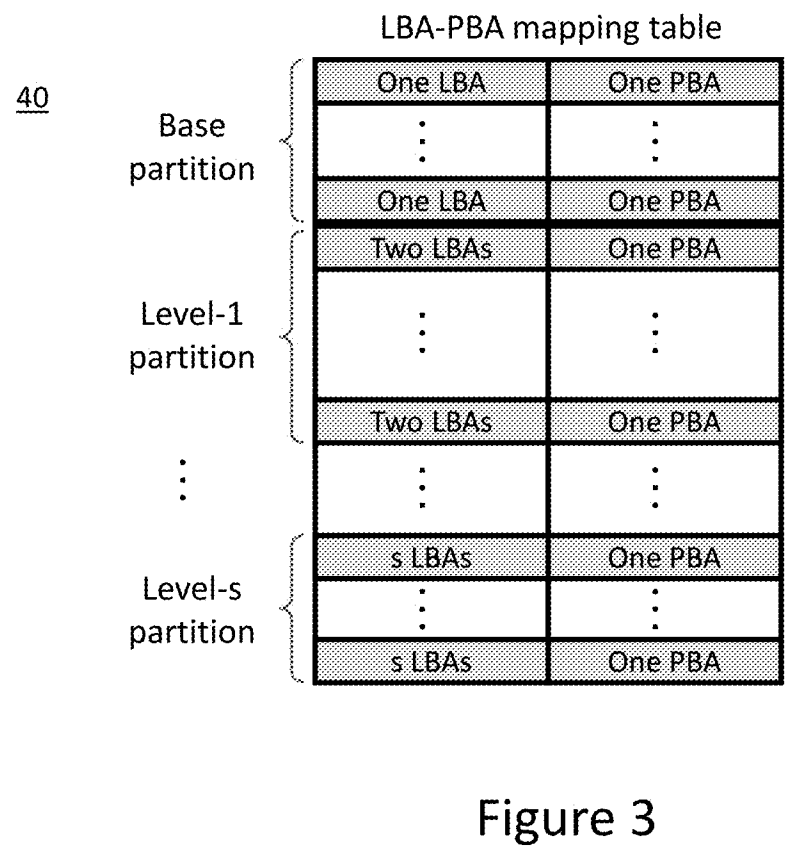

LBA-PBA mapping table

| One LBA | One PBA |
| ⋯ | ⋯ |
| One LBA | One PBA |

Base partition

| Two LBAs | One PBA |
| ⋯ | ⋯ |
| Two LBAs | One PBA |

Level-1 partition

⋯

| s LBAs | One PBA |
| ⋯ | ⋯ |
| s LBAs | One PBA |

Level-s partition

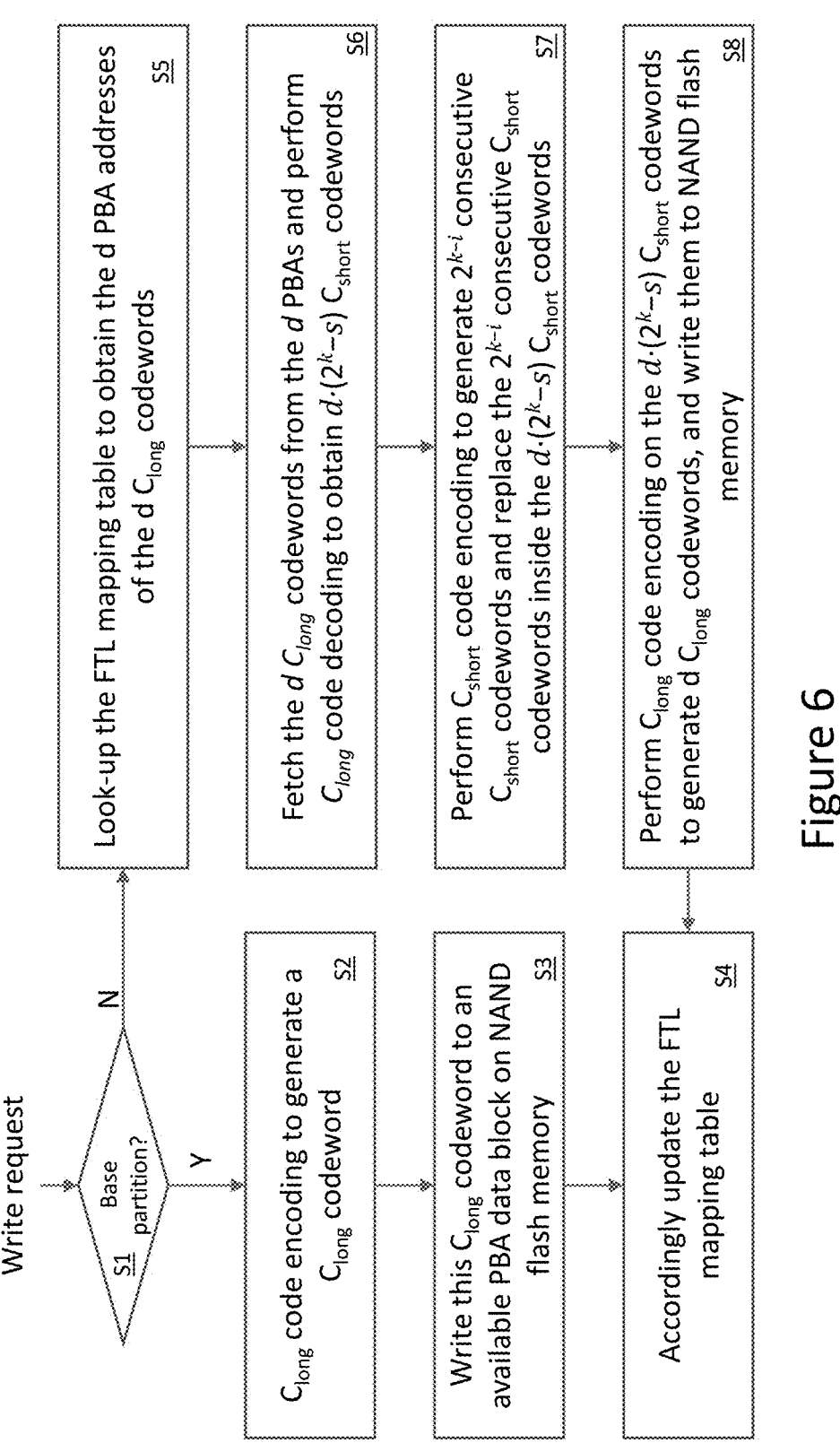

Write request

S1 Base partition?

N →

Look-up the FTL mapping table to obtain the d PBA addresses of the d $C_{long}$ codewords    S5

Fetch the d $C_{long}$ codewords from the d PBAs and perform $C_{long}$ code decoding to obtain $d \cdot (2^k - s)$ $C_{short}$ codewords    S6

Perform $C_{short}$ code encoding to generate $2^{k-i}$ consecutive $C_{short}$ codewords and replace the $2^{k-i}$ consecutive $C_{short}$ codewords inside the $d \cdot (2^k - s)$ $C_{short}$ codewords    S7

Perform $C_{long}$ code encoding on the $d \cdot (2^k - s)$ $C_{short}$ codewords to generate d $C_{long}$ codewords, and write them to NAND flash memory    S8

Y ↓

$C_{long}$ code encoding to generate a $C_{long}$ codeword    S2

Write this $C_{long}$ codeword to an available PBA data block on NAND flash memory    S3

Accordingly update the FTL mapping table    S4

Figure 6

HYBRID ERROR CORRECTION SYSTEM DESIGN FOR MULTIMODE SOLID-STATE DRIVES

TECHNICAL FIELD

The present invention relates to the field of solid-state drives (SSD), and particularly to SSDs that more effectively serve applications that demand different I/O block sizes.

BACKGROUND

Solid-state drives (SSDs), which use non-volatile NAND flash memory technology, are being pervasively deployed in numerous computing and storage systems. In addition to one or multiple NAND flash memory chips, each SSD must contain a controller chip that manages all the NAND flash memory chips. Within each NAND flash memory chip, all the memory cells are organized in an "array→block→page" hierarchy, where one NAND flash memory array consists of a large number (e.g., thousands) of blocks, and each block contains a certain number of pages (e.g., 256). The size of each flash memory page typically ranges from 8 KiB to 32 KiB, and the size of each flash memory block is typically tens of megabytes (MBs). Data are programmed in the unit of flash memory pages. NAND flash memory cells must be erased before being re-programmed, and the erase operation is carried out in the unit of blocks (i.e., all the pages within the same block must be erased at the same time). As a result, SSDs do not support in-place data update and hence must perform out-of-place data update, i.e., when the host updates/writes data, SSDs cannot directly over-write old data with the new data at the same NAND flash memory physical page location, instead SSDs must write the new data to another NAND flash memory physical page and mark the old data as invalid. One approach would be to synchronously execute all such actions on both the local client and cloud. Drawbacks with this approach however include: (1) the fact that the user could experience significant time lags waiting for the action to execute on the cloud before further actions can be taken on the client; and (2) the client may not be connected to the Internet. Another approach would be to queue actions in the cloud. However, because certain actions are dependent on other actions, the queue may quickly become loaded with actions that may no longer be required, e.g., if a file is moved from one directory to another, and then both directories are deleted without any further action on the file, a wasted action of moving the file occurs unnecessarily consuming cloud resources.

To support out-of-place data update on NAND flash memory, SSDs must internally implement an indirect data address mapping: SSDs internally manage data on NAND flash memory pages in the unit of physical data blocks. Each physical data block is assigned with one unique physical block address (PBA). Instead of directly exposing PBAs to the host, SSDs expose an array of logical block address (LBA) and internally manage/maintain the mapping between LBA and PBA. The software component responsible for managing the LBA-PBA mapping is called the flash translation layer (FTL). Since NAND flash memory does not support in-place data update, writes to one LBA will trigger a change of the LBA-PBA mapping (i.e., the same LBA is mapped with another PBA to which the new data are physically written). To ensure high-speed operation, SSDs typically integrate DRAM to keep the entire LBA-PBA FTL mapping table. Given the total NAND flash memory storage capacity, the FTL map table size reduces as the PBA block size increases. Hence, to reduce the intra-SSD DRAM cost overhead, modern SSDs use the PBA block size of 4096B and perform error correction coding (ECC) in the unit of 4096B (i.e., one PBA hosts one ECC codeword that protects 4096B user data).

BRIEF DESCRIPTION OF THE DISCLOSURE

Aspects of this disclosure provide a system, method and program product for implementing a multimode SDD that can handle different LBA block sizes.

A first aspect of the disclosure provides a multimode solid-state drive (SSD), comprising: a plurality of flash memory chips addressable via a physical block address (PBA); and a controller chip configured to map logical block addresses (LBAs) from a host to PBAs, wherein the controller chip is further configured to handle different LBA block sizes according to a process that includes: partitioning a base partition to store one a long code word of size $C_{long}$ having a single base data block protected with error correction coding (ECC); and partitioning a set of non-base partitions, each partitioned for a plurality of shortened code words, wherein each shortened code word is configured to store a shortened data block protected with ECC, and wherein the plurality of shortened code words are configured to be protected with ECC as a combined long codeword of size $C_{long}$.

A second aspect of the disclosure provides a method for implementing a multimode solid-state drive (SSD) having a plurality of flash memory chips addressable via a physical block address (PBA) and a controller chip configured to map logical block addresses (LBAs) from a host to PBAs, comprising: handling different LBA block sizes according to a process that includes: partitioning a base partition to store a long code word of size $C_{long}$ having a single base data block protected with error correction coding (ECC); and partitioning a set of non-base partitions, each partitioned for a plurality of shortened code words, wherein each shortened code word is configured to store a shortened data block protected with ECC, and wherein the plurality of shortened code words are configured to be protected with ECC as a combined long codeword of size $C_{long}$.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 depicts a further LBA partitioning, in accordance with an illustrative embodiment.

FIG. 6 depicts a flow diagram of a write request, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for an SSD infrastructure that more effectively serves applications that demand different I/O block sizes. Recent years have witnessed the significant growth of high-value artificial intelligence (AI) oriented applications that involve a huge amount of active working data set (e.g., hundreds of GiB and multiple TBs) and are meanwhile dominated by moderate-size data access (e.g., 256B or 512B per data access). For such applications, a hybrid-DRAM/SSD memory hierarchy can be much more cost-effective than a DRAM-only memory hierarchy. However, with inherent 4096B ECC, current SSDs cannot well serve moderate-size data access for those applications. Aspects of this disclosure provide systems and methods for enabling SSDs to more effectively serve moderate-size data access at minimal implementation complexity and cost overhead.

Figure 1:
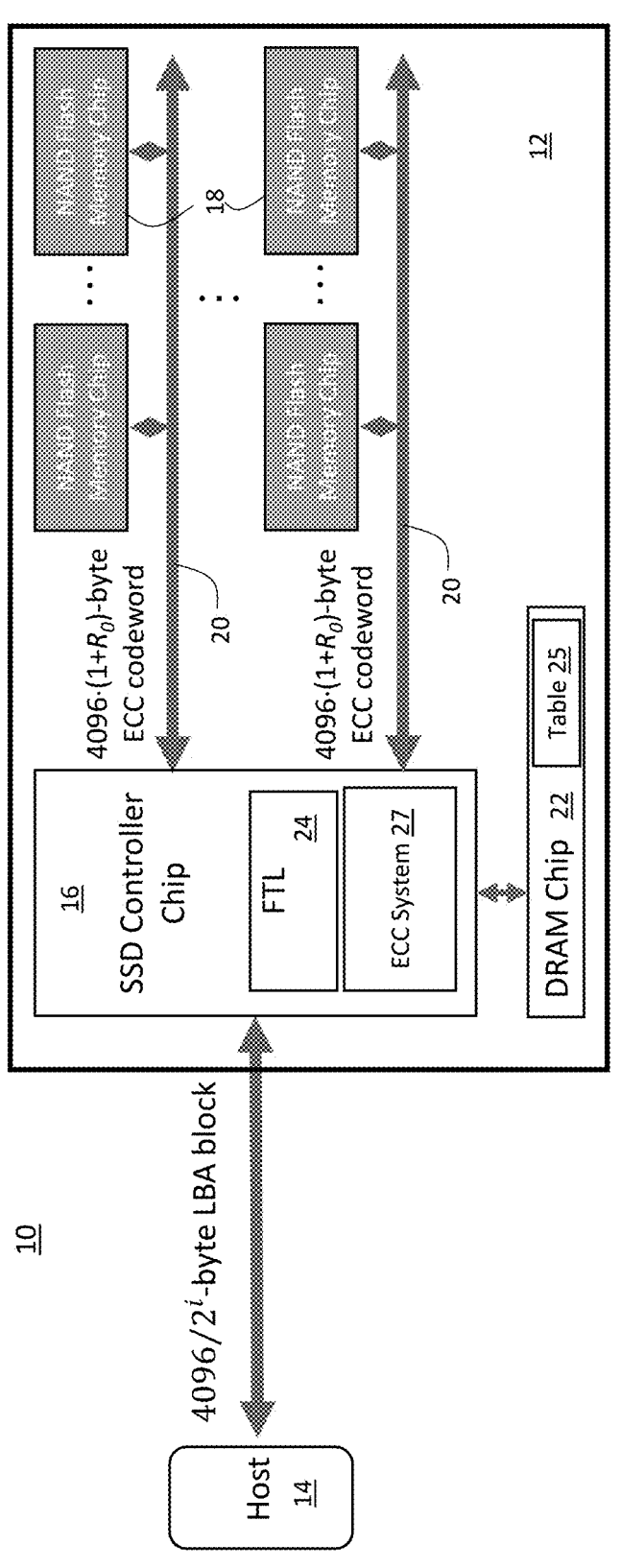
FIG. 1 depicts a memory system, in accordance with an illustrative embodiment.

FIG. 1 illustrates an SSD architecture 10 that generally includes a multimode SSD 12 coupled to a host 14. In this embodiment, SSD 12 includes a controller chip 16, multiple NAND flash memory chips 18 organized over multiple channels 20, and one (or a few) DRAM chips 22. The NAND flash memory storage space is partitioned into physical data blocks, each one is assigned with a unique physical block address (PBA). Each PBA stores one error correction code (ECC) codeword that protects 4096B user data with $(4096*R_0)$-byte coding redundant data $(R_0<1)$, hence each ECC codeword is $4096*(1+R_0)$-byte. An SSD exposes an array of logical block addresses (LBAs), each one associates with $N_i=4096/2^i$ bytes of storage space. For example, when i is 0 or 3, each LBA will associate with $N_0=4096$ bytes or $N_3=512$ bytes. The value of i is determined when SSDs are being formatted by the host 14. Since NAND flash memory does not support in-place data update, SSDs internally implement a flash translation layer (FTL) 24 to dynamically map the host-visible LBA space onto the host-oblivious PBA space inside SSDs. Hence, with the LBA block size of $N_i=4096/2^i$ bytes, the FTL 24 must maintain a mapping table 25 that maps $2^i$ consecutive LBAs onto one PBA. To ensure high speed performance, the mapping table 25 is entirely stored on the DRAM 22 inside SSDs. Also shown in ECC system 27 for performing encoding and decoding.

Recent years witnessed the significant growth of high-value AI-oriented applications that involve a huge amount of active working data set (e.g., hundreds of GBs and multiple TBs) and meanwhile are dominated by moderate-size data access (e.g., 256B or 512B per data access). For such applications, storing their huge amount of active working data set over a hybrid-DRAM/SSD memory hierarchy can be much more cost-effective than using DRAM-only memory hierarchy. SSD I/O interface protocols (e.g., NVMe) allow the host 14 to partition/format SSDs so that different partitions have different LBA block sizes (e.g., 512B or 4096B).

Figure 2:
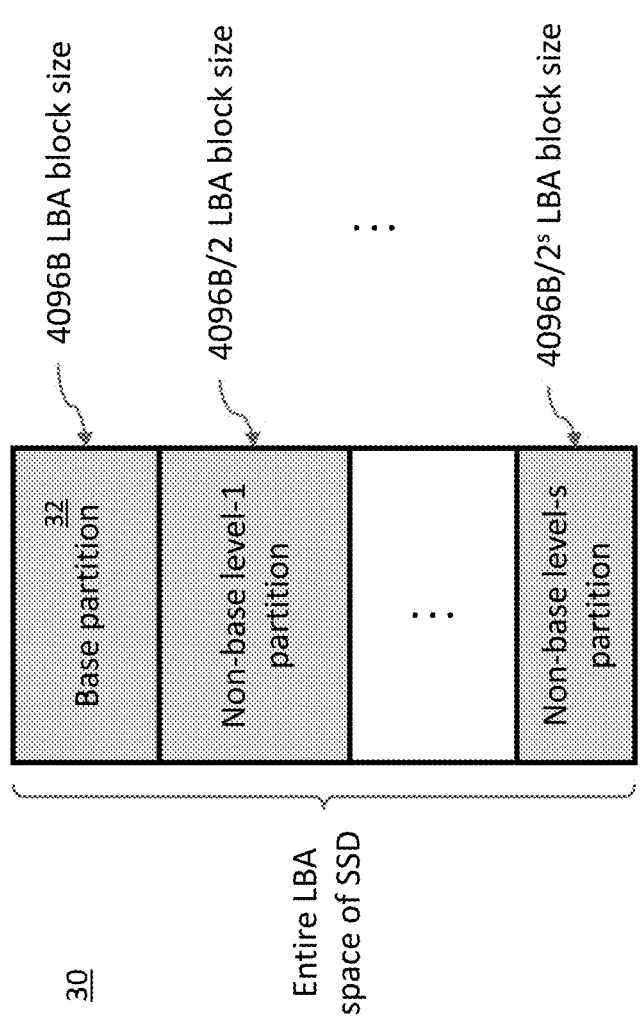
FIG. 2 depicts an LBA partitioning, in accordance with an illustrative embodiment.

FIG. 2 depicts an illustrative partitioning 30. As illustrated, to fully utilize the SSD interface I/O bandwidth, the host 14 should partition one SSD into multiple partitions, in which each partition has a distinct LBA block size of $N_i=4096/2^i$ bytes. The base level-0 partition 32 has an LBA block size of 4096B (i.e., i=0) and provides general-purpose data storage as ordinary SSDs. With less-than-4096B LBA block size, the other non-base level-i partitions can better serve applications that can benefit from less-than-4096B I/O block size (e.g., 256B or 512B per I/O block data access).

FIG. 3 depicts an illustrative mapping table 40 for handling different LBA block sizes. Inside such multimode SSDs with different LBA block sizes, a unified FTL 24 manages the LBA-PBA mapping for all the partitions. To avoid DRAM usage overhead, the FTL 24 keeps the same 4096B PBA block size. Hence, as illustrated in FIG. 3, FTL mapping table entries corresponding to different partitions cover a different number of consecutive LBAs in each entry. For example, for a partition with the LBA block size of 4096B/8=512B, each FTL map table entry covers 8 consecutive LBAs.

For multimode SSDs with different LBA block size, if the SSD controller chip 16 still follows the conventional practice of protecting each 4096B user data with a single $4096\cdot(1+R_0)$-byte ECC codeword, they will under-utilize the NAND flash memory data access bandwidth when serving data access requests over non-base partitions. This is because of the intra-SSD read amplification due to the size mismatch between $$\left(\frac{4096}{2^i}\right)$$

byte LBA data blocks and $4096\cdot(1+R_0)$-byte ECC codewords. For example, to serve a read request over a partition with a 512B LBA block size, the SSD 12 internally still needs to fetch a $4096\cdot(1+R_0)$-byte ECC codeword from NAND flash memory, leading to an 8× read amplification over the NAND flash memory chips. The smaller the partition LBA block size is, the larger the intra-SSD read amplification is. A large read amplification directly translates into a large under-utilization (or waste) of the NAND flash memory data access bandwidth. As a result, applications running over non-base SSD partitions will fail to fully exploit the intra-SSD NAND flash memory data access bandwidth.

To mitigate this problem, the most straightforward solution is to replace $4096\cdot(1+R_0)$-byte ECC with shorter $N_i$–$(1+R_i)$-byte ECC $(R_i<1)$ for the non-base level-i partition with the LBA block size of $N_i=4096/2^i$. Instead of protecting 4096B user data with a single long ECC codeword, we use a shorter-length ECC codeword to protect the $N_i=4096/2^i$ bytes of one LBA data block with $(N_i\cdot R_i)$-byte coding redundant data. However, this straightforward solution is subject to two potential problems:

(1) Under-utilization of NAND flash memory space: In modern NAND flash memory chips, each physical page could store multiple ECC codewords with the $4096\cdot(1+R_0)$-byte codeword length, i.e., each physical page can store exactly total $n\cdot4096\cdot(1+R_0)$ bytes. To achieve the same level of storage reliability, shorter-length ECC must use higher coding redundancy than longer-length ECC (i.e., $R_i>R_0$). For the non-base level-i partition, its ECC protects $N_i=4096/2^i$ bytes of user data with $(N_i\cdot R_i)$-byte coding redundant data, i.e., each ECC codeword is $4096/2^i\cdot(1+R_i)$-byte. Therefore, one NAND flash memory page can store $$m_i = \left\lfloor \frac{n\cdot4096\cdot(1+R_0)}{4096/2^i\cdot(1+R_i)} \right\rfloor = \left\lfloor 2^i\cdot n\cdot\frac{1+R_0}{1+R_i} \right\rfloor$$

level-i ECC codewords. Define $$U_i = n \cdot 4096 \cdot (1 + R_0) - \frac{4096}{2^i} \cdot m_i \cdot (1 + R_i).$$

Figure 4:
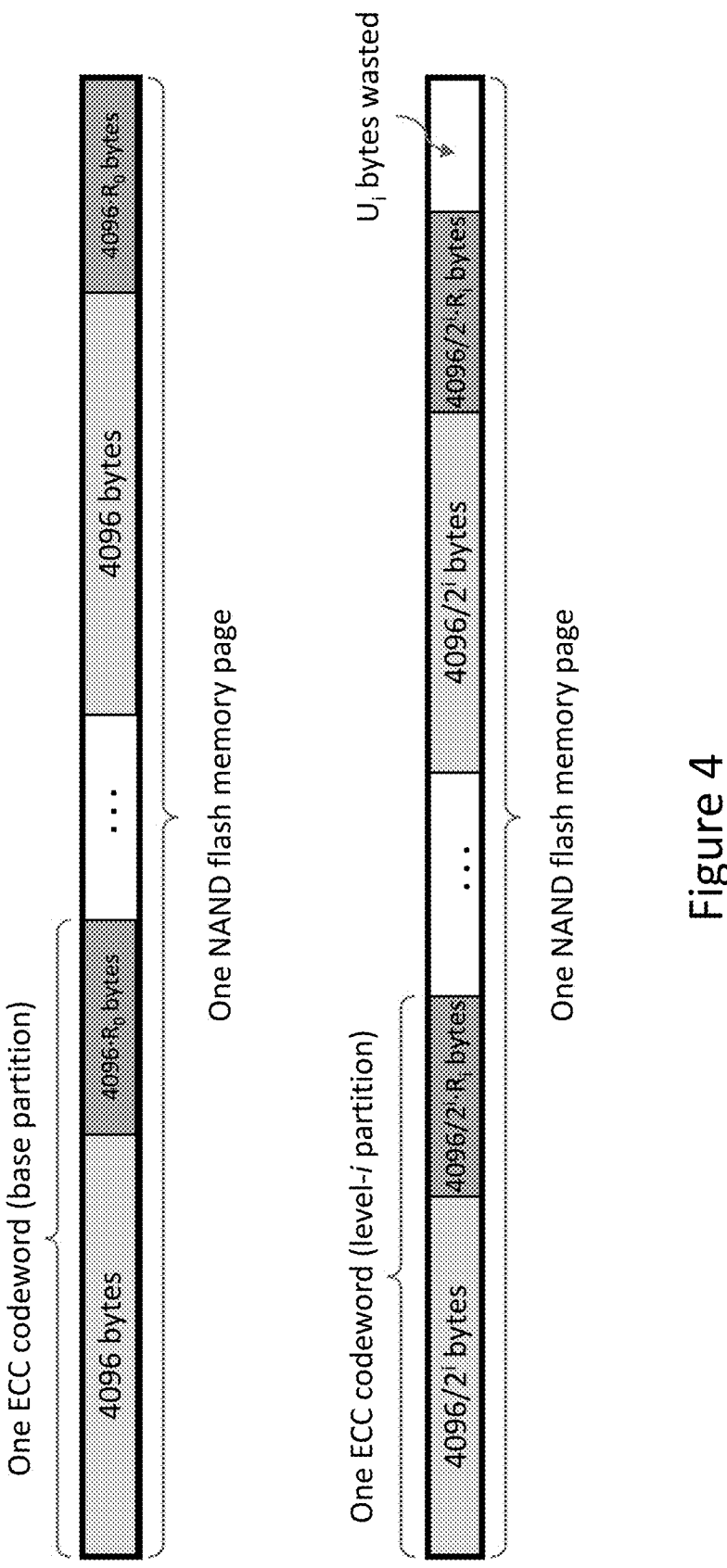
FIG. 4 depicts memory page configurations, in accordance with an illustrative embodiment.

As illustrated in FIG. 4, since $R_i > R_0$, after storing $m_i$ level-i ECC codewords, one NAND flash memory physical page still has $U_i > 0$ bytes of space empty, leading to the under-utilization of flash memory storage space.

(2) Silicon implementation cost overhead: To achieve the same operational throughput, the implementation complexity of ECC encoder/decoder increases as the ECC coding redundancy $R_i$ increases. Moreover, with different LBA block sizes, different partitions should use different ECC with different codeword lengths, which demands the implementation of different ECC encoders/decoders. All of these will cause very high silicon cost for implementing ECC encoders/decoders.

Figure 5:
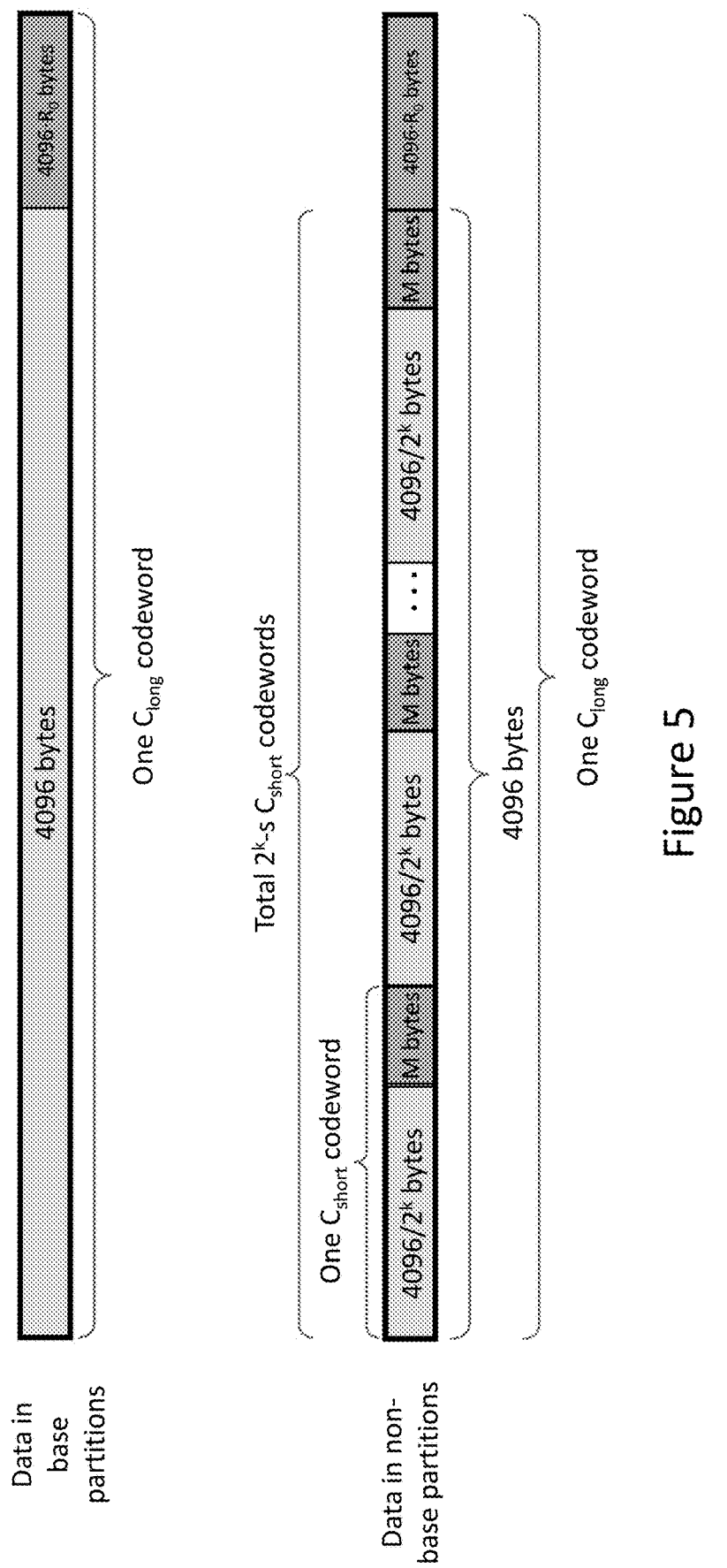
FIG. 5 depicts codeword configurations, in accordance with an illustrative embodiment.

Aspects of this disclosure provide a solution to solve the above problems. As shown in FIG. 5, the SSD controller chip 16 implements ECC for a base partition and non-base partitions differently:

Let $C_{long}$ denote the ECC that protects 4096B user data with $(4096 - R_0)$-byte coding redundant data. For the base partition with the LBA block size of 4096B, each 4096B LBA data block is protected by one $C_{long}$ codeword. Accordingly, the controller chip integrates one or multiple hardware $C_{long}$ encoders/decoders to ensure sufficiently high throughput.

Let k denote the maximum permissible value of i (e.g., 3 or 4), and define $N_k = 4096/2^k$. Let integer s denote a design parameter less than $2^k$ (e.g., 1 or 2), and define $$M = \left\lfloor \frac{s \cdot N_k}{2^k - s} \right\rfloor.$$

Let $C_{short}$ denote the ECC that protects $N_k = 4096/2^k$ bytes of user data with M $$M = \left\lfloor \frac{s \cdot N_k}{2^k - s} \right\rfloor$$

bytes of coding redundant data. For all the non-base SSD partitions, every $N_k$-byte user data block is protected by one $C_{short}$ codeword, and $2^k - s$ consecutive $C_{short}$ codewords are protected by one $C_{long}$ codeword, as shown at the bottom of FIG. 5.

FIG. 6 shows an operational flow diagram of writing one LBA data block into such multimode SSDs:

If the LBA falls into the base partition with the LBA block size of 4096B, the SSD will directly perform $C_{long}$ code encoding on the to-be-written LBA data block to generate a $C_{long}$ codeword with the length of $4096 \cdot (1 + R_0)$-byte at S2, write this $C_{long}$ codeword to an available PBA data block on NAND flash memory at S3, and accordingly update the FTL mapping table at S4.

If the LBA falls into any non-base level-i partition with the LBA block size of $4096/2^i$ bytes (i>0) at S1, the SSD must internally perform a read-modify-write operation to update one or two $C_{long}$ codewords on NAND flash memory. Since each $C_{short}$ codeword protects $N_k = 4096/2^k$ bytes of user data, the to-be-written LBA block of $4096/2^i$ bytes (k≥i>0) overlaps with $$m = \frac{2^k}{2^i} = 2^{k-i} \geq 1$$

consecutive $C_{short}$ codewords. Recall that one $C_{long}$ codeword protects $2^k - s$ consecutive $C_{short}$ codewords. Hence, the m consecutive $C_{short}$ codewords fall into $$d \leq \left\lceil \frac{m}{2^k - s} \right\rceil + 1$$

$C_{long}$ codewords. Note that $$\left\lceil \frac{m}{2^k - s} \right\rceil + 1$$

is typically equal to 2. To carry out the read-modify-write operation, SSDs first at S5 look-up the FTL mapping table to obtain the d PBA addresses of the d $C_{long}$ codewords (recall that one PBA data block stores one $C_{long}$ codeword), fetch the d $C_{long}$ codewords from the d PBAs on NAND flash memory at S6, and performs $C_{long}$ code decoding to reconstruct the total $d \cdot (2^k - s)$ $C_{short}$ codewords at S7. Meanwhile, based on the received to-be-written LBA block of $4096/2^i$ bytes, the SSD performs $C_{short}$ code encoding to generate $2^{k-i}$ consecutive $C_{short}$ codewords and accordingly replaces the $2^{k-i}$ consecutive $C_{short}$ codewords inside the $d \cdot (2^k - s)$ $C_{short}$ codewords at S7. Then SSD performs $C_{long}$ code encoding on the $d \cdot (2^k - s)$ $C_{short}$ codewords to generate d $C_{long}$ codewords, write them to NAND flash memory, and finally update the FTL map table at S8.

Figure 7:
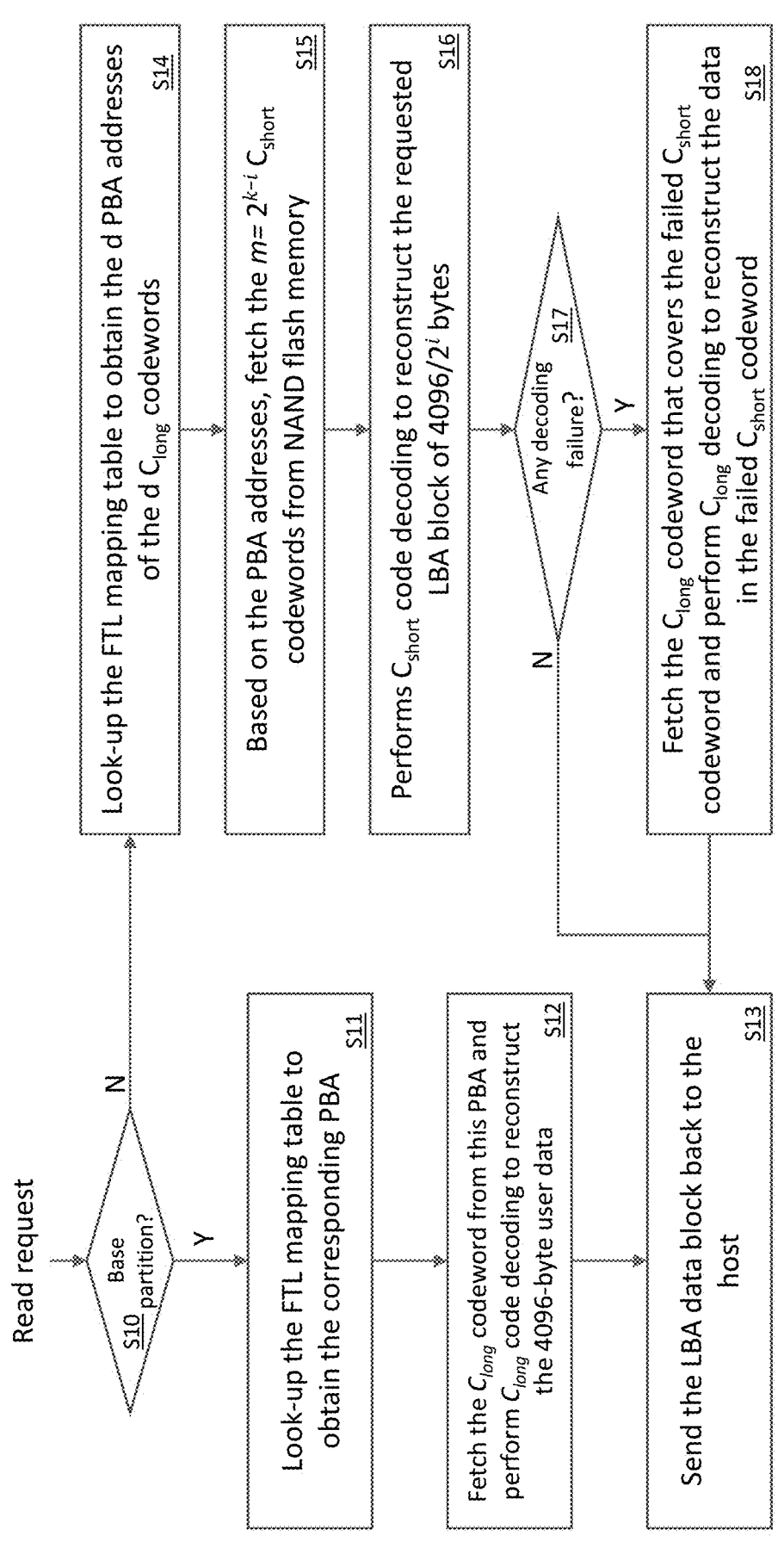
FIG. 7 depicts a flow diagram of a read request, in accordance with an illustrative embodiment.

FIG. 7 shows the operational flow diagram of reading one LBA data block from such multi-partitioned SSDs:

If the LBA falls into the base partition with the LBA block size of 4096B at S10, the SSD will look-up the FTL mapping table to obtain the corresponding PBA at S11, accordingly fetch the $C_{long}$ codeword from this PBA on NAND flash memory, carry out ECC decoding to reconstruct the original 4096B user data at S12 and send it back to the host at S13.

If the LBA falls into any non-base level-i partition at S10 with the LBA block size of $4096/2^i$ bytes, perform the following: Since each $C_{short}$ codeword protects $N_k = 4096/2^k$ bytes of user data, the LBA block of $4096/2^i$ bytes overlaps with $$m = \frac{2^k}{2^i} = 2^{k-i}$$

consecutive $C_{short}$ codewords. Recall that one $C_{long}$ ECC codeword protects $2^k - s$ consecutive $C_{short}$ codewords. Hence, the m consecutive $C_{short}$ codewords fall into $$d \leq \left\lceil \frac{m}{2^k - s} \right\rceil + 1$$

$C_{long}$ codewords. Accordingly, SSD first look-ups the FTL mapping table obtain the d PBAs of the d $C_{long}$ codewords (i.e., one PBA stores one $C_{long}$ ECC codeword), based on which SSD fetches the $$m = \frac{2^k}{2^i} = 2^{k-i}$$

consecutive $C_{short}$ codewords from NAND flash memory at S14 and S15. Accordingly, SSD performs $C_{short}$ decoding to decode the m $C_{short}$ codewords to reconstruct the requested LBA block of $4096/2^i$ bytes at S16. At S17, in case of any $C_{short}$ decoding failure, SSD will fetch the $C_{long}$ codeword that covers the failed $C_{short}$ codeword and perform $C_{long}$ decoding to reconstruct the data in the failed $C_{short}$ codeword at S18.

It is understood that aspects of the present disclosure may be implemented in any manner, e.g., as a software/firmware program, an integrated circuit board, a controller card, etc., that includes a processing core, I/O, memory and processing logic. Aspects may be implemented in hardware or software, or a combination thereof. For example, aspects of the processing logic may be implemented using field programmable gate arrays (FPGAs), application specific integrated circuit (ASIC) devices, and/or other hardware-oriented systems.

Aspects also may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on a host computer, partly on a host computer, on a remote computing device (e.g., a memory card) or entirely on the remote computing device. In the latter scenario, the remote computing device may be connected to the host computer through any type of interface or network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to control electronic circuitry in order to perform aspects of the present disclosure.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A multimode solid-state drive (SSD), comprising:
   a plurality of flash memory chips addressable via a physical block address (PBA); and
   a controller chip configured to map logical block addresses (LBAs) from a host to PBAs, wherein the controller chip is further configured to handle different LBA block sizes according to a process that includes:
   partitioning a base partition to store one a long code word of size $C_{long}$ having a single base data block protected with error correction coding (ECC); and
   partitioning a set of non-base partitions, each partitioned for a plurality of shortened code words, wherein each shortened code word is configured to store a shortened data block protected with ECC, and wherein the plurality of shortened code words are configured to be protected with ECC as a combined long codeword of size $C_{long}$.

2. The multimode SSD of claim 1, wherein the base data block comprises 4096 bytes.

3. The multimode SSD of claim 2, wherein each shortened code word is configured to protect $N=4096/2^k$ bytes of data, where k is an integer greater than 0.

4. The multimode SSD of claim 3, wherein each shortened code word is protected with M bytes of redundancy, wherein $$M = \left\lfloor \frac{s \cdot N_k}{2^k - s} \right\rfloor,$$

and s is a design parameter less than $2^k$.

5. The multimode SSD of claim 1, wherein the controller chip is further configured to perform a write operation to an LBA for an LBA data block according to a write process that includes:
   performing encoding on the LBA data block if the LBA falls into the base partition to generate a new long code word;
   writing the new long code word to a mapped PBA data block; and
   updating a flash translation layer (FTL) table.

6. The multimode SSD of claim 5, wherein the write process further includes performing a read-modify-write operation on d non-base partitions in response to the LBA falling into a non-base partition, where d=1 or 2.

7. The multimode SSD of claim 6, wherein the read-modify-write operation includes:
   fetching d combined long codewords from the d non-base partitions;
   decoding the d combined long codewords to obtain a plurality of existing shortened codewords;

encoding the LBA data block to generate a set of new shortened codewords, and replacing a set of the existing shortened codewords with the set of new shortened codewords;
   reencoding the d combined long codewords, and writing the d combined long codewords to memory; and
   updating the flash translation layer (FTL) table.

8. The multimode SSD of claim 1, wherein the controller chip is further configured to perform a read operation from an LBA for an LBA data block according to a read process that includes:
   obtaining a corresponding PBA and fetching the long code word in response to the LBA falling into the base partition;
   decoding the long code word and returning the LBA data block to the host.

9. The multimode SSD of claim 8, wherein the read process further includes:
   in response to the LBA falling into a non-base partition, obtaining PBAs for d combined long codewords, where d=1 or 2;
   fetching a set of shortened codewords based on the PBAs;
   decoding the set of shortened codewords and returning decoded shortened codewords to the host.

10. The multimode SSD of claim 9, wherein in response to a decoding failure, fetching and decoding a corresponding combined long codeword that failed.

11. A method for implementing a multimode solid-state drive (SSD) having a plurality of flash memory chips addressable via a physical block address (PBA) and a controller chip configured to map logical block addresses (LBAs) from a host to PBAs, comprising:
   handling different LBA block sizes according to a process that includes: partitioning a base partition to store a long code word of size $C_{long}$ having a single base data block protected with error correction coding (ECC); and
   partitioning a set of non-base partitions, each partitioned for a plurality of shortened code words, wherein each shortened code word is configured to store a shortened data block protected with ECC, and wherein the plurality of shortened code words are configured to be protected with ECC as a combined long codeword of size $C_{long}$.

12. The method of claim 11, wherein the base data block comprises 4096 bytes.

13. The method of claim 12, wherein each shortened code word is configured to protect $N=4096/2^k$ bytes of data, where k is an integer greater than 0.

14. The method of claim 13, wherein each shortened code word is protected with M bytes of redundancy, wherein $$M = \left\lfloor \frac{s \cdot N_k}{2^k - s} \right\rfloor,$$

and s is a design parameter less than $2^k$.

15. The method of claim 11, wherein the controller chip is further configured to perform a write operation to an LBA for an LBA data block according to a write process that includes:
   performing encoding on the LBA data block if the LBA falls into the base partition to generate a new long code word; and
   writing the new long code word to a mapped PBA data block; and updating a flash translation layer (FTL) table.

16. The method of claim 15, wherein the write process further includes performing a read-modify-write operation on d non-base partitions in response to the LBA falling into a non-base partition, where d=1 or 2.

17. The method of claim 16, wherein the read-modify-write operation includes:

fetching d combined long codewords from the d non-base partitions;

decoding the d combined long codewords to obtain a plurality of existing shortened codewords;

encoding the LBA data block to generate a set of new shortened codewords, and replacing a set of the existing shortened codewords with the set of new shortened codewords;

reencoding the d combined long codewords, and writing the d combined long codewords to memory; and updating the flash translation layer (FTL) table.

18. The method of claim 11, wherein the controller chip is further configured to perform a read operation from an LBA for an LBA data block according to a read process that includes:

obtaining a corresponding PBA and fetching the long code word in response to the LBA falling into the base partition;

decoding the long code word and returning the LBA data block to the host.

19. The method of claim 18, wherein the read process further includes:

in response to the LBA falling into a non-base partition, obtaining PBAs for d combined long codewords, where d=1 or 2;

fetching a set of shortened codewords based on the PBAs;

decoding the set of shortened codewords and returning decoded shortened codewords to the host.

20. The method of claim 19, wherein in response to a decoding failure, fetching and decoding a corresponding combined long codeword that failed.

\* \* \* \* \*